United States Patent [19]

Suzuki et al.

[11] Patent Number: 4,839,315
[45] Date of Patent: Jun. 13, 1989

[54] PROCESS FOR THE PRODUCTION OF CERAMIC MATERIALS HAVING HEAT AND WEAR RESISTANCE

[75] Inventors: Junichiro Suzuki, Gifu; Tatsuji Kinukawa, Nagoya, both of Japan

[73] Assignee: NGK Spark Plug Co., Ltd., Nagoya, Japan

[21] Appl. No.: 86,244

[22] Filed: Aug. 17, 1987

Related U.S. Application Data

[63] Continuation of Ser. No. 754,545, Jul. 15, 1985, abandoned.

[30] Foreign Application Priority Data

Jul. 13, 1984 [JP] Japan .................. 59-146481

[51] Int. Cl.$^4$ ............... C04B 35/10; C04B 35/56
[52] U.S. Cl. ........................ 501/87; 51/309; 264/65
[58] Field of Search ............ 501/87; 51/309; 264/65

[56] References Cited

U.S. PATENT DOCUMENTS

| | | | |
|---|---|---|---|
| 3,565,643 | 2/1971 | Bergna | 501/87 |
| 3,580,708 | 5/1971 | Ogawa et al. | 51/309 |
| 3,886,254 | 5/1975 | Tanaka et al. | 501/87 |
| 4,063,908 | 12/1977 | Ogawa et al. | 501/87 |
| 4,356,272 | 10/1982 | Kanemitsu et al. | 501/87 |
| 4,407,968 | 10/1983 | Lee et al. | 501/87 |
| 4,539,141 | 9/1985 | Bran et al. | 501/87 |

FOREIGN PATENT DOCUMENTS 85108727  9/1985  European Pat. Off. .

OTHER PUBLICATIONS

E. Ryshkewitch, *Oxide Ceramics*, Academic Press, pp. 200–205, 1960.
H. Yanagida et al., *J. Amer. Ceram. Soc.*, 51 [12] 704, FIG. 4150, 1968.

*Primary Examiner*—Mark L. Bell

[57] ABSTRACT

Heat- and wear-resistant ceramic materials is produced by sintering a composition until Ti cannot be detected as the metallic phase, said composition comprised of 5 to 40% by weight of $Al_2O_3$, 0.05 to 4% by weight of a sintering aid and 56 to 94.95% by weight of a TiC component in which 4 to 30% by weight of a TiC are substituted with Ti.

15 Claims, No Drawings

PROCESS FOR THE PRODUCTION OF CERAMIC MATERIALS HAVING HEAT AND WEAR RESISTANCE

This application is a continuation of U.S. application Ser. No. 754,545 filed July 15, 1985, now abandoned.

FIELD OF THE INVENTION

The present invention relates to a process for the production of ceramic materials excelling in heat resistance, wear resistance and electrical conductivity and, more particularly, to a process for the production of ceramic materials composed mainly of TiC, which are applicable as the cutting tools for ductile cast iron, etc., and are useful as the materials such as electrically conductive ceramics, for instance, as ceramic heaters as well as electrode materials, etc. which are required to possess wear and corrosion resistance.

BACKGROUND OF THE DISCLOSURE

TiC has heretofore been known as a high-temperature material having excellent anti-spalling properties, since it has a high melting point and a high density, shows a small coefficient of thermal expansion and suffers no decrease in heat conductivity at high temperatures. Since TiC is a difficult-to-sinter-material, however, a densely sintered body is only obtained as cermet through the addition of metals such as Co, Ni, etc.

SUMMARY OF THE DISCLOSURE

However, since the aforesaid cermet is governed by the behavior of metallic phases due to the fact that it is a composite material, no full advantage is taken of the aforesaid properties, especially high-temperature properties of TiC per se.

For instance, a cermet tip obtained from the aforesaid cermet is used for finish-cutting in the cutting of ductile cast iron. However, if cutting is effected at a speed exceedig as high as 300 m/min., then wearing proceeds rapidly even in that finish-cutting with an increase in crator wearing and a tendency toward chipping. At a cutting speed of no higher than 150-200 m/min., on the contrary, the finished surface becomes rough as a result of the occurrence of fusing, although the degree of roughening is not as large as the case of tips based on super-hard metals.

The present invention has been accomplished to provide a solution to the aforesaid problems, and has for its object the provision of a process for the production of densified ceramic materials which takes the advantage of TiC.

DETAILED DESCRIPTION OF THE INVENTION

According to the present invention, there is provided a process for the production of ceramic materials by sintering a composition until Ti cannot be detected as the metallic phase through X-ray diffraction (or optical microscopy), said composition comprising 5 to 40% by weight of $Al_2O_3$, 0.05 to 4% by weight of a sintering aid, and 56 to 94.95% by weight of a TiC component in which 4 to 30% by weight of TiC is substituted with Ti.

The TiC component partly substituted with Ti suitable for use as the starting material in the present invention provides a $TiC_x$ component where x is 0.80 to 0.90 corresponding approximately to the Ti amount of 10–20% by weight of TiC. As to commercially available TiC, x for $TiC_x$ is usually more than 0.95.

In the present invention $Al_2O_3$ and a sintering aid are used together with the TiC component.

$Al_2O_3$ is a chemically stable substance that excels in oxidation resistance and has a low free energy of formation. Dispersion of this material in the TiC component introduces improvements in the oxidation resistance and chemical stability of the ceramic materials as a whole. This adds oxidation resistance and chemical stability to the excellent properties TiC possesses.

In the present invention, $Al_2O_3$ is used in an amount of 5 to 40% by weight (preferably 15–35%, most preferably 20–35%). However, in an $Al_2O_3$ amount of less than 5% by weight, the effect as mentioned above is not sufficiently produced, whereas in an $Al_2O_3$ amount exceeding 40% by weight, the properties of TiC per se decrease.

In the present invention, the reason why the sintering aid is used with $Al_2O_3$ is that an $Al_2O_3$ compound formed by the reaction between $Al_2O_3$ and the sintering aid serves to promote the sintering of ceramic materials with improvements in sinterability in combination with the aforesaid effective action produced by $Al_2O_3$. In the present invention, the wording "sintering aid" refers to MgO, CaO, $SiO_2$, $ZrO_2$ or NiO, and rare earth oxides such as $Y_2O_3$, $Dy_2O_3$, $Er_2O_3$ and $Ho_2O_3$, which are usually used for sintering of $Al_2O_3$ ceramics or those composed mainly of $Al_2O_3$ such as $Al_2O_3$-TiC system, $Al_2O_3$-$ZrO_2$ system or the like system. The sintering aids may be used alone or in combination.

In the present invention, the sintering aid(s) is (are) used in an amount of 0.05 to 4% by weight (preferably 1–4%). However, in an amount of less than 0.05, the effect as mentioned above is not fully produced. In an amount exceeding 4% by weight, on the contrary, a large amount of the aforesaid $Al_2O_3$ compound gives rise to a lowering of the high-temperature properties of ceramic materials. Preferred combinations of the sintering aids embrace 0.5–1% by weight of (MgO, CaO) and 0.5–3% by weight of ($Dy_2O_3$, $Y_2O_3$).

Referring then to the Ti component contained in TiC, it is required that Ti be incorporated in TiC as solid-solution in the course of sintering so as to substantially prevent it from remaining as the metallic phase in the ceramic material. In consequence, the TiC component assumes a non-stoichiometrical composition, thus making the crystal structure incomplete and unstable. It is considered that this facilitates the sinterig reactions such as solid-phase reactions, as a result of which the sinterability of the invented ceramic material can be improved. This phenomenon also means that the interface between the $Al_2O_3$ particles and the TiC particles or the interface between the TiC particles is strengthened. Although not clarified, yet, it seems that, referring to the high-temperature strength of TiC per se, the bonding state assumes the nature of metallic bonding in addition to the inherent covalent bonding, thus resulting in improvements in strength and toughness.

In the present invention, the amount of Ti is in a range of 4 to 30% by weight (preferably 10–20%) of TiC so as to add the aforesaid properties to the ceramic materials. However, if the amount of Ti is less than 4% by weight of TiC, the effect as mentioned above is not fully obtained. If the amount of Ti exceeds 30% by weight of TiC, on the other hand, there is a possiblity that Ti may remain as the metallic phase, and there is a drop of wear resistance in view of cutting ability. In the course of sintering, it is required that Ti is incorporated in TiC as solid-solution to such an extent that it is not detected as the metallic phase at least through X-ray diffraction or optical microscopy.

The formulation according to the present invention containing $Al_2O_3$, the sintering aid and the TiC component in the predetermined amounts should be sintered in a non-oxidizing atmosphere so as to prevent oxidation of TiC and Ti.

The sintering should be conducted at a temperature of 1500°–1900° C. (preferably 1600°–1850° C., most preferably 1650°–1800° C.). The sintering may be effected through the normal sintering (i.e., without applying mechanical pressure on the mass to be sintered) or through press-sintering (i.e., under application of mechanical pressure) with different atmosphere gas pressure.

The press-sintering embraces hot press (H.P) sintering or hot isostatic pressing (HIP) sintering, the latter including preferably pre-sintering by the normal sintering. The preferred sintering temperatures are 1600°–1850° C. for the normal sintering, 1600°–1900° C. for H.P and 1400°–1900° C. for HIP. The pre-sintering preceding HIP is preferably at 1600°–1850° C. The pressure for H.P should be preferably at least 100 atm, while for HIP at least 1000 atm. Preferred atmosphere is inert gas (Ar etc.) of a few Torr to 1 atm for the normal sintering; vacuum, inert gas or atmospheric air for H.P; and inert gas (Ar etc.) for HIP.

By using the invented process for production of ceramic materials, it is possible to take the advantage of TiC and produce densified ceramic materials having heat and wear resistance.

The ceramic materials produced by the invented process for the production of ceramic materials are useful for cutting tools for cast iron such as the aforesaid ductile cast iron, steel, high nickel, aluminium, titanium and nonmetallic materials as well as for mechanical parts required to possess wear, heat and corrosion resistances. Due to their electrical conductivity, they can be used as electrically conductive ceramics, for instance, are useful as the materials for ceramic heaters or electrode materials required to possess heat and corrosion resistance.

EXAMPLES

Prepared were alpha-$Al_2O_3$, 70% of which had a particle size of no more than 1 micron ($\mu$m), a commercial grade of TiC having a mean particle size of 1.1 micron and an overall carbon content of 19.4 wt % ($TiC_x$: x=about 0.97), TiC passed through a 325-mesh sieve and a sintering aid having a purity of 99.5% or higher, which were then formulated in the proportions as specified in Table 1, and were wet-pulverized for 30 hours with acetone in a stainless ball mill resulting in a mean particle size of less than 1 $\mu$m. Thereafter, acetone was volatilized off in a drier, and the resulting products were finely pulverized in a mortar until they were all passed through a 60-mesh sieve, to thereby obtain green base powders.

The green base powders were sintered at the temperatures and by the methods, both being specified in Table 1. The sintering procedures employed in the examples were:

1. Hot-pressing at a pressure of 200 kg/cm$^2$ for a hot-pressig period of 15 minutes in a graphite mold at temperatures shown in Table 1 (designated as H.P in the Table 1).

2. One-hour sintering of a green compact in an argon atmosphere at a reduced pressure of 300 Torr at temperatures shown in Table 1 (designated as normal sintering in the Table 1).

3. Pre-sintering at temperatures specified in Table 1 for 1 hour in an argon atmosphere of reduced pressure (300 Torr), followed by sintering at 1400°–1900° C. at a pressure of 1500 atm by means of hot isostatic pressing (designated as HIP in the Table).

The thus obtained sintered bodies were polished to a tip shape of SNGN432TN and a surface state of 3S or less (according to JIS) with a diamond grinding wheel to measure the relative theoretical density and hardness thereof, and were thereafter subjected to cutting tests under the conditions as specified in Table 2. In addition, the state of Ti in the thus obtained sintered bodies were examined by means of an X-ray diffractometer.

In the comparison examples, the materials were formulated in the proportions as specified in Table 1 According to the procedures as mentioned above, sintering and shaping were carried out to measure the relative theoretical density and hardness of the thus obtained samples, which were in turn subjected to cutting tests. As was the case with the examples of the present invention, the state of Ti was examined by means of an X-ray diffractometer. The TiC cermet used was ordinarily available one.

TABLE 1-1

| Sample No. | TiC Component | Substituted Ti for TiC (wt %) Component | $Al_2O_3$ (wt %) | Sintering Aids (wt %) | | Sintering Method | Sintering Temperature (°C.) |
|---|---|---|---|---|---|---|---|
| Examples | | | | | | | |
| 1 | 62 | 8.1 | 35 | MgO 2 | $ZrO_2$ 1 | Normal Sintering | 1700 |
| 2 | 82.5 | 18.2 | 15 | CaO 1 | $Y_2O_3$ 1.5 | Normal Sintering | 1680 |
| 3 | 87 | 24.1 | 10 | $Er_2O_3$ 3 | | Normal Sintering | 1650 |
| 4 | 67 | 11.9 | 30 | MgO 1.5 | $Dy_2O_3$ 1.5 | Normal Sintering | 1700 |
| 5 | 74 | 13.5 | 25 | MgO 1 | | H · P | 1800 |
| 6 | 72 | 12.5 | 27 | MgO 1 | | " | 1800 |
| 7 | 79.5 | 21.4 | 20 | CaO 0.5 | | " | 1750 |
| 8 | 76 | 14.5 | 23 | MgO 1 | | " | 1800 |
| 9 | 79.2 | 12.6 | 20 | $Y_2O_3$ 0.8 | | " | 1800 |
| 10 | 89 | 7.9 | 9 | MgO 1 | $Y_2O_3$ 1 | " | 1700 |
| 11 | 83.5 | 15.6 | 25 | CaO 1 | $Dy_2O_3$ 0.5 | " | 1700 |
| 12 | 88.5 | 20.3 | 10 | CaO 0.5 | $Y_2O_3$ 1 | HIP | 1730* |
| 13 | 83 | 12.0 | 15 | MgO 1 | $Dy_2O_3$ 1 | HIP | 1750* |

TABLE 1-1-continued

| Sample No. | TiC Component | Substituted Ti for TiC (wt %) Component | Al₂O₃ (wt %) | Sintering Aids (wt %) | | Sintering Method | Sintering Temperature (°C.) |
|---|---|---|---|---|---|---|---|
| 14 | 88 | 15.9 | 10 | Dy₂O₃ 1.5 | NiO 0.5 | " | 1720* |
| 15 | 65 | 9.2 | 33 | CaO 1 | Ho₂O₃ 1 | " | 1720* |
| 16 | 68.5 | 10.2 | 30 | MgO 1 | Dy₂O₃ 0.5 | " | 1750* |
| 17 | 63.2 | 7.9 | 35 | MgO 1 | Y₂O₃ 0.8 | " | 1750* |
| 18 | 91 | 22.0 | 8 | CaO 0.5 | Y₂O₃ 0.5 | " | 1750* |
| 19 | 92 | 27.2 | 7 | Dy₂O₃ 1 | | " | 1780* |
| Comparison Examples | | | | | | | |
| 20 | 52 | 19.2 | 45 | MgO 1 | Y₂O₃ 2 | Normal Sintering | 1700 |
| 21 | 97 | 10.3 | 2 | CaO 1 | | H·P | 1900 |
| 22 | 88.5 | 39.5 | 10 | MgO 1 | CaO 0.5 | H·P | 1800 |
| 23 | 79 | 2.1 | 20 | MgO 1 | | H·P | 1800 |
| 24 | 75 | 20.0 | 20 | CaO 2 | Y₂O₃ 3 | HIP | 1630* |
| 25 | 64.97 | 15.4 | 35 | MgO 0.03 | | HIP | 1850* |
| 26 | 82 | 22.7 | 15 | NiO 1 | ZrO₂ 2 | H·P | 1700 |
| 27 | 68.5 | 26.3 | 30 | CaO 1.5 | | " | 1650 |
| 28 | 79 | 27.8 | 20 | MgO 1 | | " | 1650 |
| 29 | 73 | 24.7 | 25 | Dy₂O₃ 1.5 | NiO 0.5 | HIP | 1600* |
| 30 | 90.5 | 27.6 | 8 | MgO 1 | Y₂O₃ 0.5 | " | 1550* |
| TiC Cermet | | | TiC—TiN—Mo₂C—Ni System | | | | |

*presintering temperature

TABLE 1-2

| Sample No. | Relative Theoretical Density (%) | Hardness (Rockwel 45N Scale) | Metallic Phase of Ti (X-ray Diffraction) | Cutting Test | |
|---|---|---|---|---|---|
| | | | | I V$_B$ (mm) | II V$_B$ (mm) |
| Examples | | | | | |
| 1 | 98.3 | 90.3 | Absent | 0.25 | 0.15 |
| 2 | 97.2 | 90.2 | " | 0.26 | 0.16 |
| 3 | 98.5 | 89.9 | " | 0.28 | 0.17 |
| 4 | 97.9 | 90.0 | " | 0.24 | 0.15 |
| 5 | 99.2 | 91.3 | " | 0.20 | 0.08 |
| 6 | 99.5 | 91.5 | " | 0.18 | 0.06 |
| 7 | 99.6 | 90.8 | " | 0.19 | 0.12 |
| 8 | 99.3 | 91.3 | " | 0.22 | 0.09 |
| 9 | 99.2 | 91.3 | " | 0.19 | 0.09 |
| 10 | 99.1 | 91.8 | " | 0.20 | 0.12 |
| 11 | 99.7 | 91.4 | " | 0.21 | 0.07 |
| 12 | 99.5 | 90.8 | " | 0.24 | 0.15 |
| 13 | 99.6 | 90.5 | " | 0.21 | 0.11 |
| 14 | 99.3 | 90.9 | " | 0.23 | 0.13 |
| 15 | 99.2 | 90.7 | " | 0.21 | 0.10 |
| 16 | 99.4 | 91.6 | " | 0.20 | 0.09 |
| 17 | 99.3 | 91.4 | " | 0.21 | 0.08 |
| 18 | 99.3 | 90.8 | " | 0.25 | 0.12 |
| 19 | 99.5 | 90.1 | " | 0.26 | 0.15 |
| Comparison Examples | | | | | |
| 20 | 98.8 | 89.3 | " | 0.31 | 0.40 |
| 21 | 97.2 | 88.3 | " | Breakage after the Lapse of 10 sec. | Breakage after the Lapse of 10 sec. |
| 22 | 99.8 | 88.4 | Present | 0.38 | 0.44 |
| 23 | 99.7 | 89.5 | Absent | 0.40 | 0.40 |
| 24 | 99.9 | 90.2 | " | 0.35 | 0.26 |
| 25 | 91.0 | 82 | " | Breakage after the Lapse of 10 sec. | Breakage after the Lapse of 10 sec. |
| 26 | 99.3 | 88.6 | Present | 0.45 | 0.49 |
| 27 | 98.8 | 87.9 | " | Breakage after the Lapse of 10 sec. | Breakage after the Lapse of 10 sec. |
| 28 | 99.2 | 87.5 | " | 0.56 | Breakage after the Lapse of 10 min. |
| 29 | 99.5 | 88.0 | " | 0.41 | 0.45 |
| 30 | 99.6 | 87.2 | " | Breakage after the Lapse of 10 sec. | Breakage after the Lapse of 10 sec. |
| TiC Cermet | 100 | 88.1 | | Breakage after the Lapse of 1 min. | 0.18 |

TABLE 2

| | Cutting test conditions | |
|---|---|---|
| | 1 | 2 |
| Work | FCD 55 (HB 230) | FCD 55 (HB 230) |
| Cutting Speed | 230 m/min | 100 m/min |
| Rate of Feed | 0.2 mm/rev | 0.2 mm/rev |
| Depth of Cut | 0.5 mm | 0.5 mm |
| Evaluation of Tool life | Wear of clearance face after 4 min cutting $V_B$ (mm) | Wear of clearance face after 20 min cutting $V_B$ (mm) |

Measurement through the X-ray diffractometer was conducted under the following conditions:
Target: Cu
Filter: Ni
Energy kV-mA: 35-20
Full scale: 1000 cps
Time constant: 4 sec
Gonio speed: 1°/min
Chart speed: 10 mm/min
Scatter slit: 1°
Divergence slit: 1°
Receiving slit: 0.3 mm From the results set forth in Table 1, it has been found that the ceramic materials increase in wear or abrasion and, in some cases, wear off in the following samples 1 to 7 inclusive. It has thus been noted that, in order to take the advantage of TiC and produce densified ceramic materials, $Al_2O_3$ and the sintering aid(s) should be used in the given amounts and the TiC component should be substituted with Ti in the predetermined amount, and sintering should be carried out in such a manner that Ti is not detected as any metallic phase through the X-ray diffractometry, as noted from sample Nos. 1 to 19 of the examples of the present invention.

The comparative samples 20–30 relate to the following occurrences:

1. As in the case with No. 20, $Al_2O_3$ is contained in the formulation in an amount exceeding 40% by weight.

2. As is the case with No. 21, $Al_2O_3$ is contained in the formulation in an amount of less than 5% by weight.

3. As is the case with No. 22, the TiC component is substituted with Ti in an amount exceeding 30% by weight.

4. As is the case with No. 23, the TiC component is substituted with Ti in an amount of less than 4% by weight.

5. As is the case with No. 24, the sintering aid is contained in the formulation in an amount exceeding 4% by weight.

6. As is the case with No. 25, the sintering aid is only contained in an amount of less than 0.05% by weight.

7. As is the case with Nos. 26 to 30, Ti remains to such a degree that it can be detected as the metallic phase by means of the X-ray diffractometry.

The ceramic materials produced according to the invented process of the production thereof were measured for the electrical conductivity, which was found to range from about 50 to $100 \times 10$hu $-6$ ohm.cm, although varying depending upon the composition. This conductivity is considered to be ones with superior electric conductivity among the practical ceramic materials used in the prior art.

As shown in Table 1, the inventive Examples provide high relative theoretical density of more than 99% and high hardness (Rockwel 45N scale) of more than 90.

What is claimed is:

1. A process for the production of a heat- and wear-resistant ceramic material as a highly densified sintered body, said process comprising:
   (a) preparing a composition consisting essentially of 5 to 35% by weight of $Al_2O_3$, 0.05 to 4% by weight of a sintering aid and 61 to 94.95% by weight of a TiC component in which 4 to 30% by weight of TiC are substituted with Ti, and
   (b) sintering said composition until Ti cannot be detected as a metallic phase such that Ti is incorporated in TiC to produce $TiC_x$ where $0.65 < x < 0.95$ forming a main phase having a continuous, uniform network that extends through the entire sintered body.

2. A process as defined in claim 1, in which said sintering aid is at least one selected from the group consisting of MgO, CaO, $SiO_2$, $ZrO_2$, NiO and rare earth oxide.

3. A process as defined in claim 2, in which said rare earth oxide is at least one selected from the group consisting of $Y_2O_3$, $Dy_2O_3$, $Er_2O_3$ and $Ho_2O_3$.

4. A process as defined in claim 1, in which the sintering is carried out at 1500°–1900° C.

5. A process as defined in claim 4, in which the sintering is carried out at 1600°–1850° C.

6. A process as defined in claim 1, in which the sintering is conducted in a non-oxidizing atmosphere.

7. A highly densified sintered heat- and wear-resistant ceramic body produced by the process as defined in claim 1, wherein said $TiC_x$ forms the main phase.

8. The ceramic body according to claim 7, said product having a relative density of at least 97.2% and a hardness of at least 90 on the Rockwell 45N scale.

9. The ceramic body accordig to claim 8, said product having a relative density of at least 99%.

10. A highly densified sintered heat- and wear-resistant ceramic body produced by the process as defined in claim 2, wherein said $TiC_x$ forms the main phase.

11. The ceramic body according to claim 10, said product having a relative density of at least 97.2% and a hardness of at least 90 on the Rockwell 45N scale.

12. The ceramic body according to claim 11, said product having a relative density of at least 99%.

13. A highly densified sintered heat- and wear-resistant ceramic body produced by the process as defined in claim 3, wherein said $TiC_x$ forms the main phase.

14. The ceramic body according to claim 13, said product having a relative density of at least 97.2% and a hardness of at least 90 on the Rockwell 45N scale.

15. The ceramic body according to claim 14, said product having a relative density of at least 99%.

* * * * *